P. RUSSELL & A. W. SCHRAMM.
AIR COMPRESSING APPARATUS.
APPLICATION FILED AUG. 17, 1907.
978,062.
Patented Dec. 6, 1910.
4 SHEETS—SHEET 2.
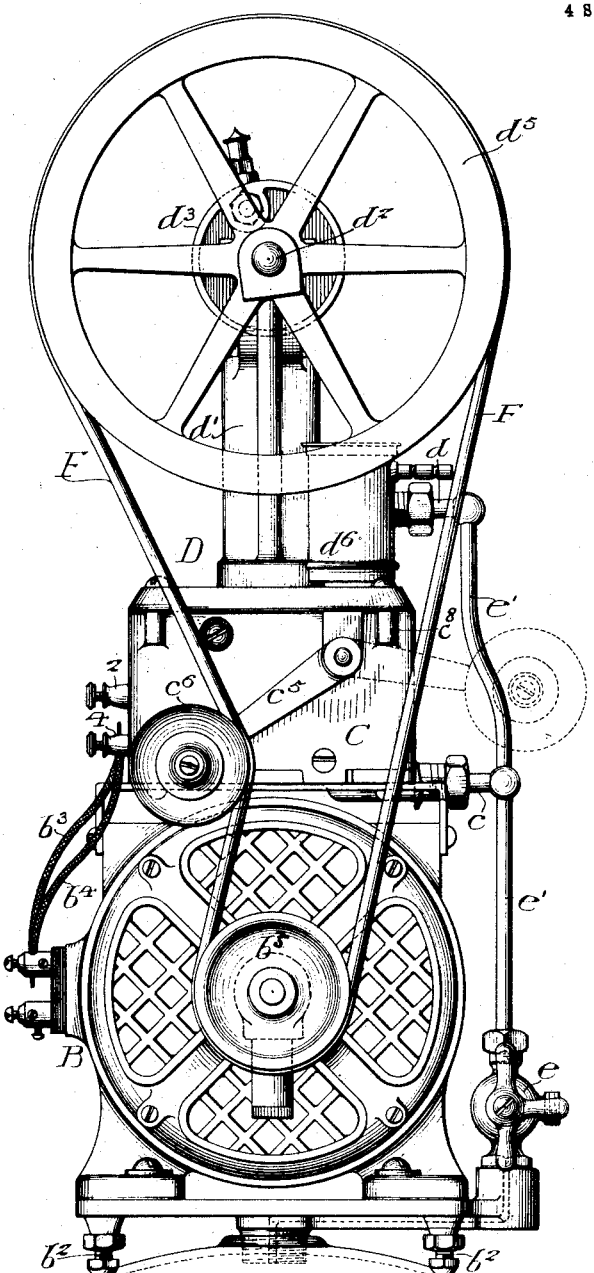
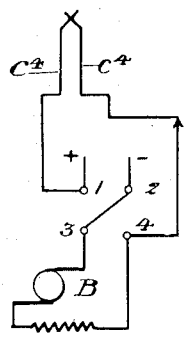

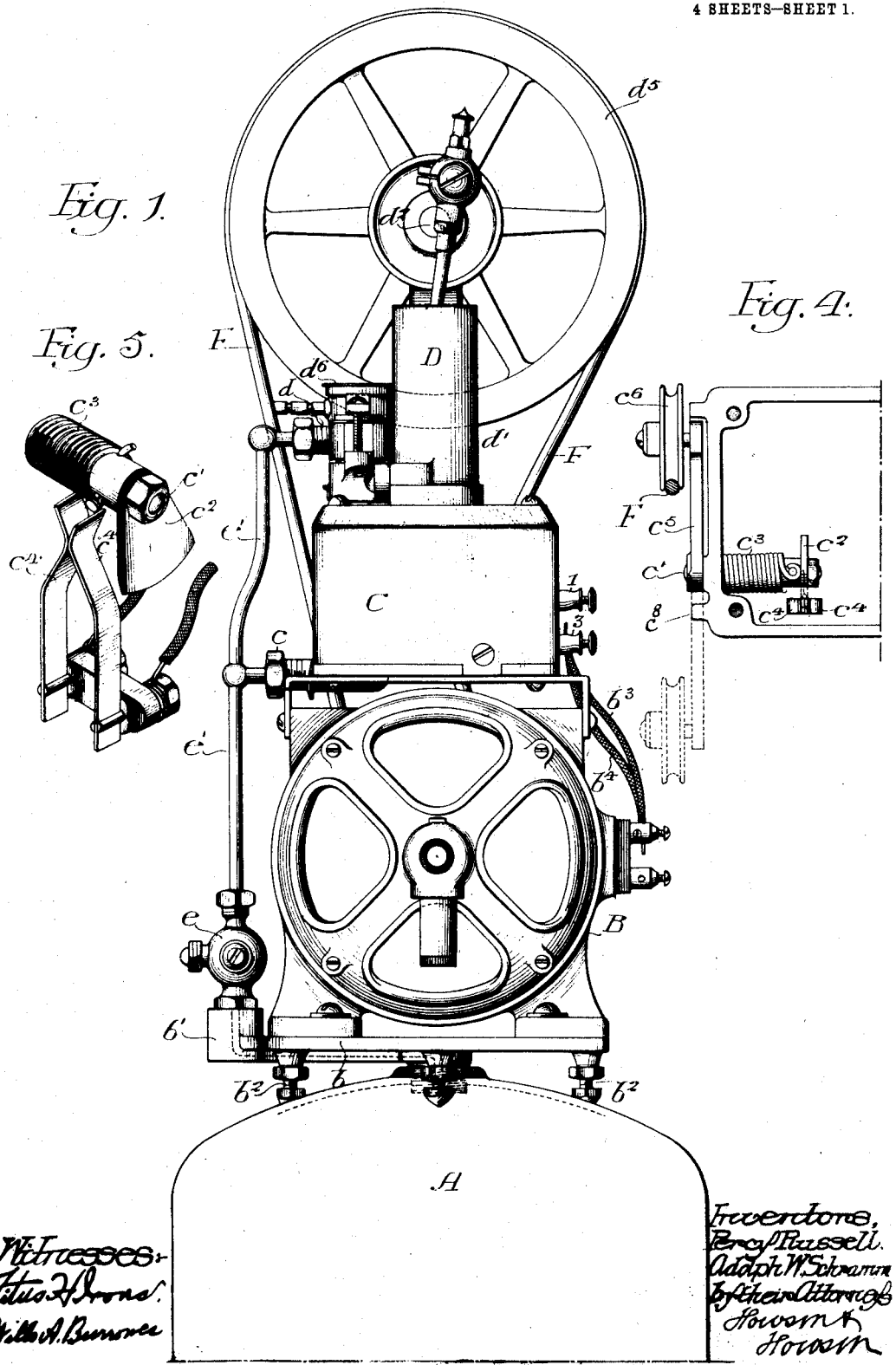

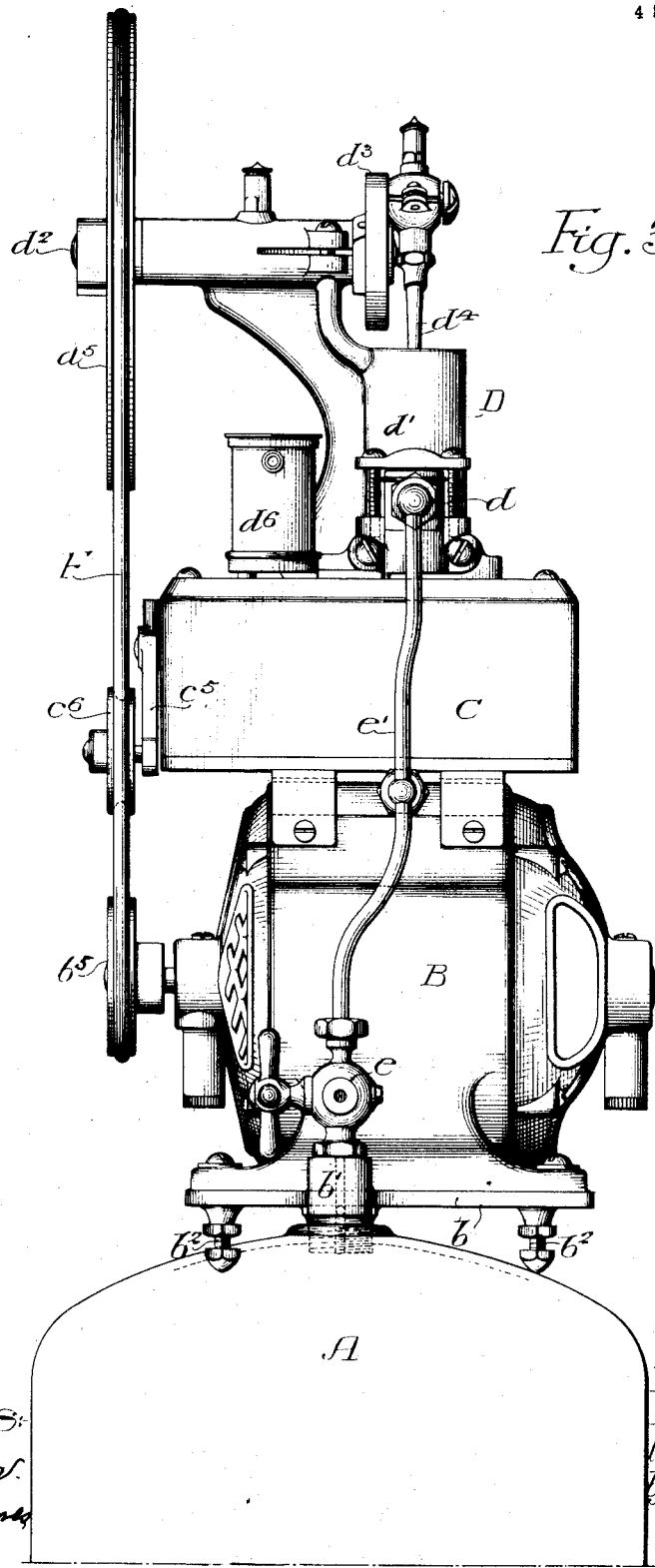

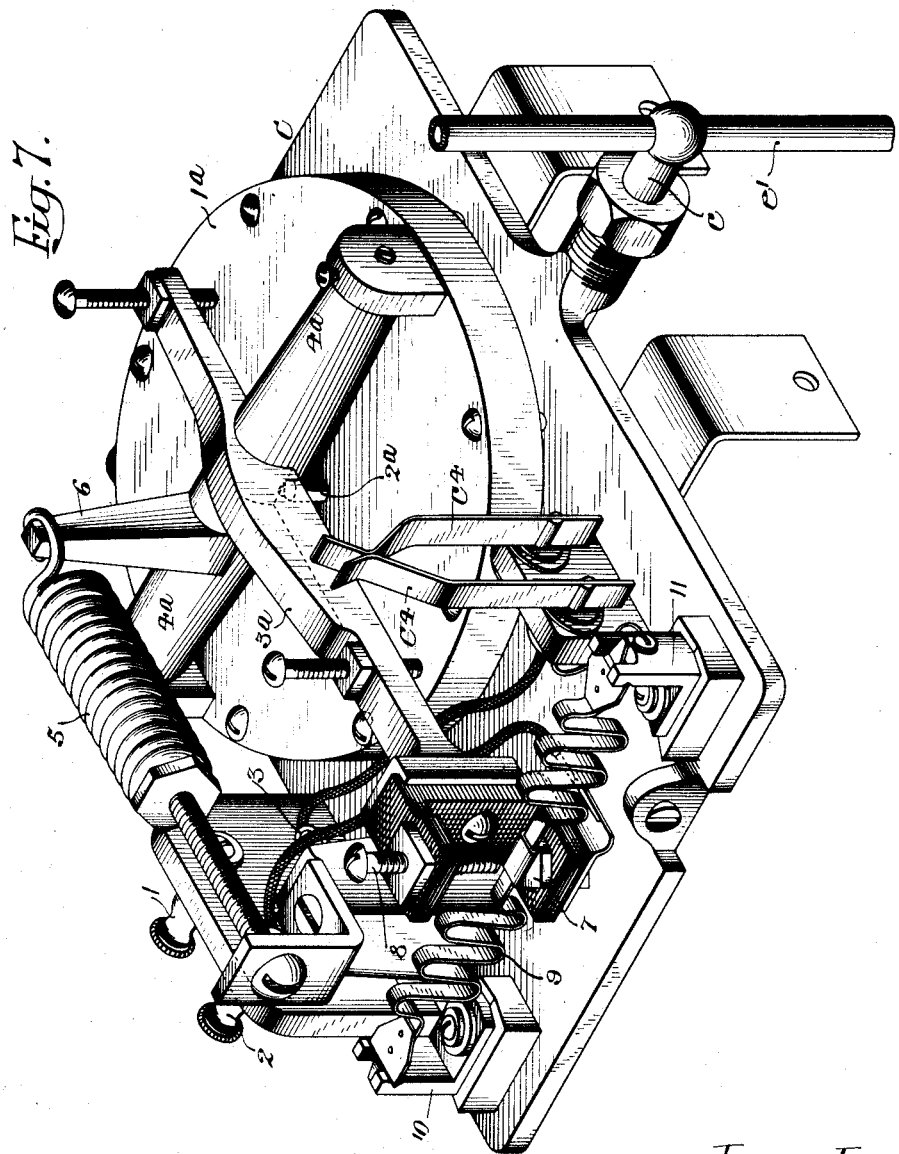

UNITED STATES PATENT OFFICE.

PERCY RUSSELL, OF NEW YORK, N. Y., AND ADOLPH W. SCHRAMM, OF RIVERTON, NEW JERSEY, ASSIGNORS TO ELECTRO DENTAL MANUFACTURING COMPANY, OF PHILADELPHIA, PENNSYLVANIA, A CORPORATION OF PENNSYLVANIA.

AIR-COMPRESSING APPARATUS.

978,062. Specification of Letters Patent. Patented Dec. 6, 1910.

Application filed August 17, 1907. Serial No. 389,068.

*To all whom it may concern:*

Be it known that we, PERCY RUSSELL and ADOLPH W. SCHRAMM, citizens of the United States, residing in Greater New York, N. Y., and Riverton, New Jersey, respectively, have invented certain Improvements in Air-Compressing Apparatus, of which the following is a specification.

One object of our invention is to provide what is in effect a compact, efficient, and quiet, automatically controlled air compressing plant, particularly adapted for use by dentists, physicians, or for others who employ compressed air for any purpose.

It is further desired to provide an assemblage of apparatus including a compressor driven from a motor by a belt, with means whereby, in the event of the belt breaking or flying off of its pulleys, the current would be automatically cut off from the motor.

We also desire to so arrange the elements of an air compressing plant that the electric as well as the pipe connections shall be relatively few in number and short in length so that the cost of construction and space occupied by it shall be reduced to a minimum.

Another object of the invention is to arrange the piping of apparatus having the above characteristics and to provide it with means so that the various elements may be conveniently and quickly tested to ascertain whether they are air tight or to locate a leak.

These and other advantageous ends we secure as hereinafter set forth, reference being had to the accompanying drawings, in which—

Figure 1, is an elevation of one end of the apparatus comprising our invention; Fig. 2, is an elevation of the other end of the apparatus shown in Fig. 1; Fig. 3, is an elevation of one side of the apparatus shown in Figs. 1 and 2; Fig. 4, is a plan illustrating the construction of the belt controlled switch forming part of our invention; Fig. 5, is a perspective view further illustrating the switch shown in Fig. 4, Fig. 6, is a diagrammatic view of the electrical connections, and Fig. 7, is a perspective view illustrating the mechanism contained within the controller box forming part of our invention.

In the above drawings A represents a storage tank for compressed air and this is employed as a means of support for the remainder of the apparatus.

The pump motor B is mounted directly upon the top of the tank A while the pump D is carried upon the controller box or casing C, which in turn is carried by the motor B.

The platform for the motor is supplied with a passage, indicated in dotted lines in Figs. 1 and 2, connecting with an opening at the top of the tank A, the passage extending horizontally through the motor base $b$ and terminating in a boss $b'$. This boss has screwed into it a three way valve $e$ connected through a pipe $e'$ with the outlet $d$ of the pump and also with a conduit $c$ leading into the controller box C. This valve also has a third outlet for the attachment of a rubber pipe or other conduit leading to the apparatus to be supplied with compressed air. The connection between the motor base and the tank is so designed that it serves as the means for mechanically holding the motor, box and pump in position on the tank. The motor base is provided with four feet in the form of adjustable screws $b^2$ whereby it may be properly adjusted as to its position and support upon the top of the tank.

The controller box has four terminals 1, 2, 3 and 4, of which any two, except diagonally opposite pairs, may be connected to the line, while the remaining pair is connected to leads $b^3$ and $b^4$ from the terminals of the motor. This controller box contains the mechanism whereby current is automatically supplied to and automatically cut off from the motor B, depending upon the air pressure in the tank A. While as a matter of fact any form of air controlled switch may be employed in this controller box, we preferably use the one described and claimed in an application for patent filed by Adolph W. Schramm and Alfred E. Oswald, on August 29, 1907, Serial Number 390,677. There is also contained in the controller box C a switch illustrated in detail in Figs. 4 and 5 and designed to be controlled by the pump driving belt. This switch consists of a spindle $c'$ extending through the side of the box and carrying on its inner end a plate or bar $c^2$ of insulating material. There is also a pair of spring contacts $c^4$ mounted within the controller box in such manner as to normally tend to engage each other and so placed as to be capable of being separated by the plate $c^2$.

The branch pipe $c$ communicates with the interior of a casing $1^a$ which contains a metallic or other suitable diaphragm, which, with its mounting is omitted, as these are of any suitable construction whose detail features form no part of the present invention. Said diaphragm, however, operates upon a pin $2^a$ which in turn engages a lever $3^a$ provided with trunnions $4^a$, journaled in suitably formed lugs projecting upwardly at the sides of the diaphragm-casing $1^a$. The lever and the diaphragm are maintained in a definite position by a spring 5 which acts upon an arm 6 of the said lever. One of the horizontally projecting arms of the latter carries a pair of stops 7 and 8, of which the lowermost is connected to one of the electric terminals of the device. A movable switch member 9 is confined between two abutments 10 and 11 in such a manner that it is maintained in either one of two bowed positions, in engagement either with the contact 7 or with the stop 8. One of the spring contacts $c^4$ is connected to the abutment 11 and hence to the spring switch member 9, and it will be understood that the remainder of the contacts are connected to the terminals 1, 2, 3 and 4, so as to secure the objects previously noted.

Fixed to the outer end of the spindle is an arm $c^5$ carrying an idler pulley $c^6$, and a spring $c^3$ is so fixed to said spindle $c'$ that it tends to turn this to such a position that the insulating plate $c^2$ will be interposed between the spring contacts $c^4$. The arm $c^5$ with its pulley will then occupy the position indicated in dotted lines in Figs. 2 and 4, and a stop $c^8$ is provided to prevent said arm from moving past this position. The pump, which as before noted, is mounted on the top of controller box, is provided with a vertically placed cylinder $d'$ and a horizontally extending main shaft $d^2$. This latter is connected to the piston of the pump (not shown) through a crank $d^3$ and a connecting rod $d^4$ being provided at one end with a relatively large pulley $d^5$. This pulley is in line with the idler pulley $c^6$ carried on the arm $c^5$ of the controller box and also with a pulley $b^5$ on the motor shaft, so that a relatively short belt F may be used to connect said pulleys in the manner clearly illustrated in Fig. 2. The air for the pump is taken through a combined filter and muffler casing $d^6$ and under operating conditions is compressed by the pump so as to be delivered through the pipe $e'$ to the controller box C and to the tank A.

From Fig. 6, it will be noted that the spring contacts $c^4$ are placed in series with the motor B and one of the line terminals, there being also in series with said motor and said spring contacts, a switch $c^7$, whose operation is dependent upon the variations of the air pressure within the tank A.

Under operating conditions it will be seen that the spring $c^3$ tends to turn the arm $c^5$ and with it the pulley $c^6$ from the position shown in full lines in Fig. 2, to the position shown in dotted lines and it will be understood that this spring is so designed as to maintain the proper tension upon the belt F for most efficiently transmitting the power from the motor B to the pump D. If for any reason, this belt should break or fly off its pulleys, the spring $c^3$ will at once turn the arm $c^5$ into the position shown in dotted lines and thereby cause the plate $c^2$ of insulating material to be interposed between the two spring contacts $c^4$, thus breaking the motor circuit and stopping the motor. The three way valve or cock $e$ is provided with a handle which, as shown, has three arms and said valve is so constructed that its internal passages extend in lines substantially parallel to the lines of said arms. By means of this valve it is possible to ascertain the presence and location of a leak in any part of the apparatus since if a pressure gage be connected to its horizontal outlet, the existence of a leak any where in the system would, with the valve in the position shown in Fig. 2, be at once shown by a falling of the gage needle; it being assumed that the tank contained air under a pressure of say sixty pounds to the square inch. If the handle be turned 180° from the position shown, then a falling of the gage needle would indicate a leakage in whatever piping or apparatus was connected to the horizontal outlet of the valve. On the other hand, when the handle is turned so that its middle arm is directed vertically upward then, a falling of the gage needle would point to a leak in the air pump mechanism controller box, or in the piping above the valve $e$, while if the handle is mounted so that its middle arm points downwardly, the gage would give evidence of a leak in the tank or in the connections below said valve.

We claim:

1. The combination of a motor, a controller box mounted thereon, a pump on the controller box, a normally closed switch in said box in circuit with the motor, a spring actuated arm, a pulley thereon, a belt connecting the motor and the pump and engaged by said pulley, a shaft fixed to said arm and supported so as to extend in a line passing between the two runs of the belt, and means operatively connected to the shaft for causing opening of the switch when the belt is disengaged from the pulley.

2. The combination of a motor having a driving pulley, a pump also having a pulley, a switch in circuit with the motor, an arm having a body of insulating material and carrying an idler pulley, a belt for said pulleys, with a spring acting on the arm and placed to tend to move the body of insulating material between the switch contacts and also to cause the idler pulley to tighten the belt.

3. The combination of a tank for compressed air, a motor mounted on said tank, a base member for said motor provided with an air passage formed in its body and connected to the tank, a controller box mounted on the motor, a pump mounted on the controller box, and an air conduit communicating with the passage in the base of the motor, with the pump, and with the controller box.

4. The combination of a tank; a motor; a controller box having a switch including a belt controlled member; and a pump, said pieces of apparatus being superposed respectively one upon and vertically above the other; a belt connecting the motor and the pump and controlling the operation of said switch member; with means whereby the tank, motor, controller box, and pump are rigidly connected together.

5. The combination of a tank with a controller box, a motor, and a pump mounted one above the other on said tank, a conduit connecting the controller box and the pump with the tank, and screws placed between the tank and the motor in positions to reinforce and prevent side strains upon said conduit where it enters the tank.

6. The combination of a tank; a motor having a base provided with an interior passage and mounted on the tank; and a pump carried by the motor; said base including a structure directly connected to the tank for rigidly holding said apparatus in position, and the passage of the base communicating with the tank through said structure.

7. The combination of an electric motor, a pump, a belt connecting said motor and the pump, and an electric switch, said switch consisting of a pair of contacts normally in engagement with each other, a revoluble spindle, an insulating piece carried by said spindle, a spring tending to move said piece between the two contacts, and an arm having a portion engaging the belt and connected to the spindle so as to normally hold said piece away from the contacts.

8. The combination of a tank, a motor, air actuated controlling means for said motor and a pump mounted on said tank, a conduit including a passage extending through the base of the motor for connecting the tank with the said controlling means and with the pump, said conduit terminating in a threaded plug entering the tank, with a three way valve placed in the conduit.

9. The combination of a tank; a motor and a pump mounted one above the other in a substantially vertical series; a centrally placed threaded connection between the tank and the motor for holding said parts upon the tank and having a passage for conducting air into and out of said tank; with compression members also between the tank and the motor in positions to coöperate with the central connection in holding the parts in place.

10. The combination of an electric motor; a pump; a belt connecting said motor and pump for driving the latter; a motor controlling switch including a movable member; an arm engaging the belt and connected to the member; with a spring acting on the arm and normally tending to open the switch.

In testimony whereof, we have signed our names to this specification, in the presence of two subscribing witnesses.

PERCY RUSSELL.
ADOLPH W. SCHRAMM.

Witnesses:
CHARLES C. NORRIS, Jr.,
M. ELEANOR ROBERTS.